United States Patent Office

3,043,848
Patented July 10, 1962

3,043,848
(2,2,2-TRINITROETHYL)-2-NITRAMINO-2-IMIDAZOLINE
Howard A. Hageman, Englewood, N.J., assignor to United States Rubber Company, New York, N.Y., a corporation of New Jersey
No Drawing. Filed July 7, 1950, Ser. No. 172,610
2 Claims. (Cl. 260—309.6)

This invention relates to a new chemical compound, a ($\beta,\beta,\beta$-trinitroethyl) - 2 - nitramino - 1,3 - diaza-2-cyclopentene, and a method of making it from 2-nitramino-1,3-diaza - 2 - cyclopentene, formaldehyde and trinitromethane.

The new compound of my invention is a ($\beta,\beta,\beta$-trinitroethyl)-2-nitramino-1,3-diaza - 2 - cyclopentene melting at 168–169° C. with decomposition. The new compound may also be called a (2,2,2-trinitroethyl)-2-nitramino-2-imidazoline, according to a common system of nomenclature. It is made by reacting 2-nitramino-1,3-diaza-2-cyclopentene, also known as 2-nitramino-2-imidazoline, with formaldehyde in a slightly alkaline solution, neutralizing the alkaline material, and subsequently reacting the intermediate compound with trinitromethane. The 2-nitramino-1,3-diaza-2-cyclopentene and formaldehyde are brought together, preferably in equimolar proportions and preferably in a suitable mutual solvent, such as water, to which has been added a small amount of an alkaline material to act as a catalyst for the condenstion. As such a catalyst there may be used an alkaline or alkaline earth hydroxide or carbonate which brings the pH of the solution above 7. The solution is neutralized after a suitable time, preferably with a weak acid such as carbon dioxide. The intermediate compound, which need not be removed from the neutralized solution, is reacted with trinitromethane, preferably in equimolar proportions. After being heated for some time the solution is cooled, thereby causing the reaction product to crystallize. It may be separated conveniently by filtration.

This new compound is useful as an explosive and/or propellant.

The reactions are presumed to be as follows:

(1)
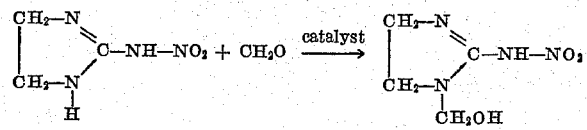

(2)
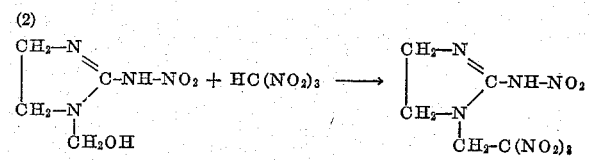

The expected compound thus is 1-($\beta,\beta,\beta$-trinitroethyl)-2-nitramino-1,3-diaza - 2 - cyclopentene. Alternately the formaldehyde may react with the secondary amino group of the —NH—NO$_2$ radical, thereby forming 2-(N-($\beta,\beta,\beta$-trinitroethyl)-nitramino)-1,3-diaza-2-cyclopentene.

In this example all parts are by weight.

*Example*

To a solution of 0.1 part of barium hydrozide in 10 parts water are added 3.9 parts (0.03 mol) 2-nitramino-1,3-diaza-2-cyclopentene (made as directed by McKay and Wright J. Am. Chem. Soc. 70, 430 (1948)). The resulting suspension is then treated with 2.4 parts (0.03 mol) 37% formalin, causing the solid to go into solution. After a short time carbon dioxide is bubbled through the solution, and the precipitated barium carbonate is filtered. The clear filtrate is then added to a solution of 4.5 parts (0.03 mol) trinitromethane in 10 parts water, causing the mixture to become cloudy within a few minutes. The mixture is then heated on the steam bath for a sufficient time to complete the reaction and cooled in an ice bath, causing crystallization of a white solid (3.2 parts). This is recrystallized from 95% ethanol to give 2.1 parts of a ($\beta,\beta,\beta$ - trinitroethyl)-2-nitramino - 1,3 - diaza-2-cyclopentene, long white needles, melting at 168–169° C. with decomp. Impact sensitivity: 2.5 kg., hammer, 30 cm. *Analysis.*—Calcd. for $C_5H_7N_7O_8$: carbon 20.5%, hydrogen 2.4%, nitrogen 33.4%. Found: carbon 21.1%, hydrogen 2.2%, nitrogen 34.5%.

I claim:

1. As a new chemical compound, a (2,2,2-trinitroethyl)-2-nitramino-2-imidazoline made by the method of claim 2 and melting at 168–169° C. with decomposition.

2. A method of making a (2,2,2-trinitroethyl)-2-nitramino-2-imidazoline which comprises reacting 2-nitramino-2-imidazoline with an equimolar amount of formaldehyde at a pH above 7, and reacting the resulting reaction product with trinitromethane.

References Cited in the file of this patent

McKay et al.: J. Amer. Chem. Soc., vol. 70, pp. 3990–3994 (1948).